UNITED STATES PATENT OFFICE.

CHARLES FRANKLIN ECKART, OF OLAA, TERRITORY OF HAWAII.

PROCESS FOR INCREASING THE YIELD OF SUGAR-CANE.

1,228,006. Specification of Letters Patent. Patented May 29, 1917.

No Drawing. Application filed May 13, 1916. Serial No. 97,292.

*To all whom it may concern:*

Be it known that I, CHARLES F. ECKART, a citizen of the United States, residing at Olaa, Hawaii, Territory of Hawaii, have invented certain new and useful Improvements in Processes for Increasing the Yield of Sugar-Cane; and I do hereby declare the following to be a full, clear, and exact description of the invention, such as will enable others skilled in the art to which it appertains to make and use the same.

The present invention has for its object to provide an improved process of increasing the yield of sugar-cane by increasing the number and hastening the development of the canes ordinarily known as the second-season stalks, or those stalks which make most or all of their growth and development after the first winter of the crop period. In some localities the conditions are such that the entire crop of sugar-cane is matured within one calendar year, while in other localities the conditions are such that the entire crop does not develop within one calendar year, but extends into two or three calendar years. In the latter instance, one set of canes is well advanced in growth and development at the end of the first season, and during the second season, that is, after the first winter of the crop period, a second set of canes makes its growth from the shoots emanating from the mother cane. At the end of the entire crop period, the two sets of canes are simultaneously harvested. The process herein described is intended to increase the number and hasten the development of the canes of the second set which make their growth during the second season, thereby increasing the yield of the entire crop.

This is done in the preferred form of the process by suddenly checking the growth of the first season canes at the beginning or a little before the beginning of the second growing season and simultaneously illuminating the entire field at the time of effecting the sudden check of the growth of the canes by allowing abundance of light to reach the ground in and between the rows of cane and to reach the young shoots of the second season canes. At from two to four weeks before the time of checking the growth of the first season canes and the above mentioned illumination of the field, a fertilizer, preferably of a nitrogenous character, is applied to the cane row, after the latter has been "cleaned out" or largely freed from weeds and dead cane leaves.

The sudden checking of the growth of the first season canes and the simultaneous illumination of the field causes the springing of young cane shoots from buds lying beneath the surface of the ground, or in other words produces active suckering or tillering of the first season canes, and also greatly promotes the growth of the second season shoots. The application of the nitrogenous fertilizer stimulates the growth of the first season canes so that when the growth-checking operation is performed subsequently, the check is more pronounced than it would be without the fertilizer treatment, and the number of the second season shoots is correspondingly increased. The growth of the second season shoots is also increased through the action of the fertilizer.

The above-mentioned growth-checking operation performed on the first season stalks is preferably effected by laborers who pass between the rows of cane and with suitable knives, or other implements, cut off the leafy tops of the cane stalks at a place on each stalk which is well above the uppermost immature joint or node and therefore well above the terminal growing point of the stem. In the preferred manner the operator makes a transverse cut through the leafy mass at the desired point so that after the treatment each stalk bears a fan-like cluster of leaf parts. The removal, by cutting, of the leafy tops is best effected during cloudy or showery weather and if performed during clear or dry weather the cutting should be sufficiently high so as to permit a considerably larger fan-like cluster of leafy matter to remain on the cane stalk in order that a proper amount of shade, as well as light, will be afforded the new shoots for their optimum development. It has been found in practice that the "topping" of the canes at a point well above the uppermost, green, immature node affords sufficient check to the canes and sufficient illumination of the cane rows to bring about the desired results.

When the topping is performed too low, however, the check in growth of the first season canes is unnecessarily severe, the recovery is slower, and the subsequent yield of this particular set is less than if the topping were performed higher. Low "topping" likewise has a tendency to cause some of the lateral buds, of that part of the stem which is above ground, to sprout, which is undesirable and opposed to the aims of this process. Under average conditions "topping" at a point from five to ten inches above the uppermost exposed or partly exposed leaf-sheath ligule answers all requirements. When the cutting is performed at or above this latter point very few, if any, of the lateral buds of that part of the stem which is above ground are caused to sprout.

As the leafy tops are cut from the cane stalks, they are preferably deposited as a layer on the ground between the cane rows where they form an effective covering for the straggling growth of weeds, and eventually kill the greater proportion of the same. The "cleaning out" or removal of weeds and dead leaves from the cane row a short time prior to the "topping" of the cane permits many young shoots to make their start at such time so that when the leafy tops of the first season canes are subsequently removed, a number of the young shoots will have already made considerable headway. It is preferably at this time, that is, the time of "cleaning out" that the fertilizer is applied. The exact nature of the fertilizer is, of course, immaterial to the invention, but preferably nitrate of soda, or some other material or mixture having a high nitrogen content, is employed.

It will now be seen that the first season cane stalks treated in the manner indicated are suddenly checked in growth. The amount of leafy matter left on the cane stalk after the "topping" operation is naturally relatively small and is considerably out of proportion to the root system of the stalk. This induces a greater number of the underground eyes or buds of the cane stalk to sprout and causes the new cane shoots so formed to grow vigorously. The second season shoots thus increased in number and sturdiness are afforded abundant light through the removal of the leafy tops of the mother canes. The second season canes, therefore, make an exceptionally rapid and robust development which is intensified by the action of the nitrogenous fertilizer.

While under ordinary conditions, most of the young shoots which come up in a cane field after the cane is well advanced, or "closed in", as the expression is, soon die from being shaded out, as has been stated, there are always some very young and immature canes which are present in the general stand at harvest. These plants, being very immature, naturally lower the average quality of the cane juice below what the general quality would be if they were not present. The present process, by stimulating very active tillering or suckering of the cane plants in bi-annual or tri-annual crops at a time which is nearly a year or more before the regular harvest, causes many underground eyes or buds to be productive of well seasoned canes at harvest which would otherwise sprout at seemingly hap-hazard intervals during the later stage of the crop and lower the general quality of the juice. The young shoots which are started by the topping operation furthermore are favored with a greater total amount of light throughout their career than the young second season shoots in a bi-annual or tri-annual crop which has not been treated by the process covered in this invention. This extra amount of light is conducive to the formation of an added amount of sugar in the second season shoots resulting from the process as compared with the amount of sugar elaborated by the second season shoots which develop under the conditions of the ordinary practice, and which, for a considerable period at the start, are obliged to grow in almost semi-darkness. The sudden check given the first season canes in the topped rows likewise affects favorably the percentage of sucrose contained in their juice, since it is well known in cane agriculture that agencies which depress growth, even temporarily increase the percentage of sucrose in the juice of the sugar-cane stalk. It has been found in actual practice that the juice of cane, topped in the manner above described, is of better quality than the juice of cane which has not been topped.

It has been noted in practice that nitrogenous fertilizing material, or fertilizer mixtures containing nitrogen when applied to the cane rows, cause a more intense and lasting green coloration in the leafy growth left on the stalk after topping and in the new growth which subsequently develops after the topping operation than occurs with untopped canes fertilized with the same amount of the same fertilizer at the same time. On account of the reduction in the amount of leafy matter of the cane plants through "topping", the ratio between the amount of applied nitrogen (and other fertilizing elements) and a unit amount of functioning plant parts is greatly increased. It has been found in actual practice that canes topped in the manner above described have shown a response to fertilization, which, when measured in ultimate yields, was practically double that shown by untopped cane receiving the same amount and kind of fertilizer. For instance, in actual practice the difference in the yield between fertilized topped and unfertilized topped cane has amounted to practically ten tons of cane per acre, whereas under the same conditions, the difference between the fertilized untopped and unfertilized untopped cane has amounted to practically five tons of cane per acre. Naturally a part of this difference in the gain from fertilization is due to the action of the fertilizer in hastening the development of new shoots resulting from the topping, but large differences of a similar nature have been noted on certain small areas in which the difference between the numbers of young shoots in untopped cane and very late topped cane was relatively small. In referring to this point relating to the intensified action of fertilizing material on topped cane, I, of course, do not intend to disregard the somewhat quicker recovery which would be expected to occur in fertilized topped canes than in unfertilized topped canes, but from the observation of the process in practice, the quicker recovery of the topped canes and the general stimulation of the younger shoots do not explain the magnitude of the fertilizer action above referred to. Apparently under ordinary conditions, nitrogenous and other fertilizing elements find their way to many leaves whose functions have practically finished as well as to leaves which are functioning actively. In topped cane, on the other hand, the active fertilizing elements in their new serviceable combinations, are obliged to concentrate themselves in very actively funtioning parts, since the more or less inert leaves have been very largely removed. The amount of nitrogenous or other fertilizing material which is available from a given fertilizer dressing for the actively functioning parts of a given number of topped canes is, therefore, considerably greater than that which is available for the actively functioning parts of an equal number of untopped canes. The growth center or growing point of each cane stem or stalk represents potentially the future development of the plant in so far as the inherent forces of the plant organism can control it. In fertilizing topped cane, therefore, one might say that we are fertilizing nearer to the center of growth. In other words, it is the same, to all intents and purposes, as if the topped canes were treated to a much heavier application of fertilizer than the untopped canes, the actual amount of fertilizer applied per acre, however, remaining the same. Although at the time of the topping operation, the treated canes are temporarily checked, this check is subsequently more than made up for through the highly intensified action of the fertilizer which has been applied with the result that a substantial gain in yields is obtained.

Besides the tillering or suckering which is induced in the older canes which have been topped in the manner described, it will be noted that practically all of the canes so treated are placed by the operation upon the same basis as regards light and shade. Whereas prior to the time of topping many of the canes would be in a weakened condition in consequence of an injurious amount of shade cast by their more robust or more favorably situated neighbors, after the topping a large number of these weakened canes manifest a normal growth activity. While the topping causes a number of the very weak canes to die, it causes a very much larger number of canes which otherwise would have died before maturity to reach the harvesting stage.

In a period of approximately two or three months, the tops of the mother canes again grow out into their normal condition, but in the meantime, the number and proportion of the young or second season shoots have been increased far past the normal ratio. If the leafy tops of the first season canes do not grow out into their normal condition, due to the topping operation, that is, if the leaves do not attain the same size as the original leaves, the result is rather advantageous instead of objectionable, as the smaller size leaves will permit a larger amount of light to reach the second season canes.

It has been found in actual practice that the "topping," in the manner described, of the first season canes to effect a sudden check in their growth does not result in a material loss of the first season stalks. It is to be expected, of course, that a number of the first season stalks, especially the very weak ones, will be killed and lost by the topping operation, and likewise that the development of the first season stalks will be retarded until such time as they have produced new tops after the treatment, but this loss of canes and the checked growth is more than compensated for by the large increase in the number of second season canes.

Since the larger the proportions of early started and vigorous second season shoots in the ultimate stand of cane at harvest, the greater is the total yield of cane, it is obvious that the novel treatment of the sugarcane, as above set forth, results in materially increased profits.

What I claim is:—

1. The process of stimulating the tillering or suckering of sugar-cane plants, which consists in removing, above the uppermost immature node or terminal growing point of the stem, a portion of the leafy top of each stalk to produce a sudden check in the growth of the plants and to allow an increased amount of light to reach the base of the stalk.

2. The process of stimulating the tillering or suckering of sugar-cane plants which consists in removing, above the uppermost immature node or terminal growing point of the stem, the apical portion of the leafy top of each stalk, and then depositing the portion of the leafy top, thus removed, near the base of the plant for the purpose of forming a weed-covering layer.

3. The process of stimulating the tillering or suckering of sugar-cane plants, in rows, which consists in cleaning out or weeding the cane rows, applying a fertilizing material to the cane rows, removing, above the uppermost immature node or terminal growing point of the stem, a portion of the leafy top of each stalk, and depositing the leafy material, thus removed, as a weed preventive layer between the cane rows, substantially as described.

4. The process of increasing the total yield of sugar-cane and the like in bi-annual or tri-annual crops, which consists in temporarily checking the primary apical growth of the first season stalks, and simultaneously increasing the amount of light supplied to the second season shoots.

5. The process of increasing the total yield of sugar-cane in bi-annual or tri-annual crops, which consists in removing the weeds and the dead leaves from the plant rows, applying a fertilizing material to said rows, temporarily checking the primary apical growth of the first season stalks, and increasing the amount of light supplied to the second season shoots.

6. The process of increasing the total yield of sugar-cane in bi-annual or tri-annual crops, which consists in checking the growth of the first season stalks by removing the leafy top of said stalks above the uppermost immature node or terminal growing point, and increasing the amount of light supplied to the second-season shoots.

7. The process of increasing the total yield of sugar-cane in bi-annual or tri-annual crops, in rows, which consists in applying a fertilizing material to the cane rows, checking the growth of the first season stalks by removing the leafy top of each of said stalks above the uppermost immature node or terminal growing point, and increasing the amount of light supplied to the second-season shoots.

8. The process of stimulating the tillering or suckering of sugar-cane plants by the removal of the apical portion of the leafy tops, thus producing a sudden and temporary check to the primary apical growth of the stalks of the canes so treated and illuminating simultaneously the interior of the cane rows and the spaces between and adjacent thereto, substantially as described.

9. The process of stimulating the tillering or suckering of sugar-cane plants in rows, which consists in trimming the tops of said plants into a fan-like cluster of basical leaf-segments, by cutting transversely through the leafy mass above the uppermost immature node or terminal growing point of the stem, thus producing a sudden check to the canes so treated, and illuminating simultaneously the interior of the cane rows and the spaces between and adjacent thereto, substantially as described.

10. The process of promoting the tillering of sugar-cane plants in rows, which consists in trimming the tops of said plants above the uppermost immature node or terminal growing point into a rigid or semi-rigid fan-like cluster of basical leaf-segments, and depositing the leaf trimmings in the form of a weed-covering layer between the cane rows, substantially as described.

11. The process of increasing the proportion of second-season shoots in a bi-annual or tri-annual crop of sugar-cane plants, in rows, which consists in weeding and removing dead leaves from the cane rows, applying fertilizer material to said rows, trimming the tops of the first season canes above the uppermost immature node or terminal growing point into fan-like clusters of basical leaf-segments, and depositing the leafy matter, removed by the trimming, in the form of a weed covering layer between the cane rows, substantially as described.

12. The process of increasing the proportion of second-season stalks in a stand of sugar-cane, which consists in weeding the cane rows and removing dead leaves from the cane, applying fertilizing material to said cane rows, temporarily checking the primary apical growth of the first season stalks thus increasing the illumination of the second-season shoots, trimming the leafy tops of the first season canes into a fan-like form so as to afford a protecting medium for the young second-season shoots against undue exposure to intense sunshine, and depositing the trimmings from the leafy tops as a weed-covering layer between the cane rows, substantially as described.

13. The process of increasing the proportion of second-season stalks in a bi-annual or tri-annual crop of cane, in rows, which consists in cutting transversely through the leafy tops of the first season canes at a point in each top which is above the uppermost partly exposed leaf-sheath, and depositing the leafy matter thus removed as a weed-covering layer between the cane rows.

14. The process of increasing the proportion of second-season stalks in a bi-annual or tri-annual crop of cane, which consists in stimulating the growth of the cane, suddenly subjecting its primary apical growth to a temporary check and admitting light to the shoots at the bases of the cane.

In testimony whereof I affix my signature.

CHARLES FRANKLIN ECKART.